United States Patent [19]

McClure

[11] 4,429,661
[45] Feb. 7, 1984

[54] HEAT RECOVERY APPARATUS AND METHOD

[76] Inventor: Michael C. McClure, 2808-17 Mile Rd., Sterling Hgts., Mich. 48078

[21] Appl. No.: 325,532

[22] Filed: Nov. 27, 1981

[51] Int. Cl.³ .............................................. F22B 33/00
[52] U.S. Cl. ............................ 122/20 B; 165/DIG. 2; 431/215
[58] Field of Search ........................... 122/20 A, 20 B; 431/215; 165/DIG. 2

[56] References Cited

U.S. PATENT DOCUMENTS

| | | |
|---|---|---|
| 2,028,471 | 1/1936 | Parent et al. |
| 2,677,243 | 5/1954 | Telkes |
| 3,400,249 | 9/1968 | Mekjean et al. |
| 3,507,256 | 4/1970 | Sander ............................. 122/20 B |
| 3,944,136 | 3/1976 | Huie |
| 3,974,642 | 8/1976 | Pacault |
| 4,011,904 | 3/1977 | Hope et al. .................... 122/20 B X |
| 4,079,885 | 3/1978 | Decker |
| 4,090,492 | 5/1978 | Simmons |
| 4,136,731 | 1/1979 | DeBoer |
| 4,163,441 | 8/1979 | Chen |

Primary Examiner—Edward G. Favors
Attorney, Agent, or Firm—Remy J. VanOphem

[57] ABSTRACT

A flue gas heat recovery apparatus for reconstituting thermal energy normally lost through the venting of flue gases from a heat liberating plant is disclosed. The apparatus can be employed with forced air or hydronic systems and includes a compressor which draws hot gases from the exhaust flue through a first heat exchanger located in a cold fluid return to the plant, thereby transferring thermal energy from the gases to fluid (typically air or water) flowing in the return duct. The compressor operates to substantially elevate the pressure and temperature of the flue gases passing therethrough and discharges them through a second heat exchanger located in the return duct upstream of the first heat exchanger to further transfer thermal energy from the gases to the fluid flowing therein. Gases exiting the second heat exchanger are directly vented to the atmosphere or, alternatively, are first filtered to remove particulate matter. Additionally, the compressor can be disposed within the return duct to provide still more transfer of thermal energy to the return duct fluid.

25 Claims, 2 Drawing Figures

HEAT RECOVERY APPARATUS AND METHOD

FIELD OF THE INVENTION

This invention relates to apparatus and methods for recovering waste heat in exothermic processes and particularly to apparatus and methods for recovering heat from exhaust gases normally vented through an exhaust flue from a heating plant.

BACKGROUND OF THE INVENTION

Ever since man first endeavored to build and operate heating plants within inhabited structures for the heating thereof or for otherwise providing a useful energy source, two related problems have been almost universally recognized. One is that heating plants, which operate by the controlled combustion of fuel-oxygen mixtures, can liberate substantial amounts of toxic, poisonous or explosive vapors as well as purge the structure of breathable oxygen. The second problem arises from attempts to remedy the first, that is, from the venting of the vapor's products of combustion from the structure by use of chimneys, stacks, flues or the like. The combustion taking place in the heating plant, being exothermic in nature, heats the vapors liberated thereby. If the vapors are vented from the structure, so to is a significant quantity of heat, thereby reducing the amount of heat remaining to warm the structure or perform other useful work. Restated, substantial inefficiencies result from the venting process.

When fuel was inexpensive and plentiful, gross inefficiencies in the heating plants were accepted. However, recent awareness of diminishing reserves of fuel and astronomical increases in fuel prices, particularly in hydrocarbon based fuels, have accentuated the need to improve heating plant efficiency. Furthermore, the long term need to reduce total heat emissions on a global basis to avoid a "greenhouse effect" is being postulated by an increasing segment of the world scientific community.

The basic problem of improving heating plant efficiency is that of somehow preventing the escape of flue gas heat while, at the same time, insuring safe and complete venting of the vapors. Two basic approaches are found in the prior art. One approach is the use of thermally responsive dampers which close or restrict flow through the exhaust flue during certain portions of the heating plant's operating duty cycle. Such devices are only partially effective and can present a substantial safety risk in some failure modes. Additionally, such devices typically only operate during off or rest modes and have a de minimis effect on efficiency during "burner on" operation of the heating plant.

The second approach of recovering waste heat in an exhaust flue found in the prior art is embodied in apparatus employing secondary heat flow paths to recycle or regenerate waste heat into useable heat. Such approaches typically include a heat exchanger series connected with the exhaust flue to absorb thermal energy from the heated flue gases passing therethrough. The heat exchanger has a liquid circulating therethrough in a closed loop with a second heat exchanger located in the cold air return. The liquid carries the absorbed thermal energy to the second heat exchanger which, in turn, transfers it to the air flowing in the cold air return. The net effect of this transfer is to reduce the inlet-outlet temperature differential of the heating plant. With the reduction in differential, the plant requires less fuel to maintain the associated heated structure at the same level.

A typical prior art device, such as that described immediately herein above, is disclosed in U.S. Pat. No. 4,136,731 to DeBoer, which discloses a heat transfer system for use in supplementing the operation of a heating/cooling system of a building and its hot water heating system. The device includes a heat exchanger in the flue of the furnace as well as a heat exchanger in the fan chamber. A first liquid circulation loop couples the heat exchangers for transferring heat from the flue exchanger to the air moved through the fan chamber heat exchanger. A second liquid circulation loop includes a flue exchanger and the building hot water heater for supplementing the heating of water therein. In the summer months, during the cooling mode of the system's operation, cold water employed, for example, for lawn sprinkling is passed through the fan chamber heat exchanger for cooling and dehumidifying air circulated in the building. A valve control system is employed to automatically control the flow path of fluid in the system as a function of detected temperatures.

Alternative prior art approaches employ air as the intermediate media for the capturing of flue gas heat. Examples of such an approach are disclosed in U.S. Pat. No. 3,944,136 to Huie and U.S. Pat. No. 4,163,441 to Chen. Huie discloses a heater unit and draft control adapted to be connected to an existing solid, liquid or gas fuel heating furnace which includes a heat exchanger having a stack gas passage connected in series to a stack from the furnace and a blower which forces air through the heat exchanger and into the plenum of the furnace. A stack cooler and/or draft control includes a pipe extending from outside the heated structure into the exit portion of the stack gas passage with an adjustable damper therein. Chen discloses an air duct disposed between the top end of the heat exchanger of a furnace and the entry port into the flue pipe of the furnace. An electrical blower is coupled to the duct to draw hot air therethrough which would otherwise go out to the atmosphere through the flue. The hot air drawn by the blower is redirected to heat, or assist in heating, the building to which the furnace is directing heat or heat some other facility. An electrical control circuit is connected to the blower and controls the blower such that if the furnace is burning fuel the blower cannot be turned on. The blower can only be turned on after a predetermined time has elapsed from the time that the fuel burning has terminated, so that combustion gases which otherwise would pass through the flue and which might contain harmful ingredients therein, will not be redirected to be used as a source of heat.

The ever increasing cost of most fuels, as in the last decade, caused developers of heating plants to seek further efficiency improvements which heretofore were not cost effective. One approach was to remove even more heat from flue gases, and to remove heat from flue gases during a greater portion, or all, of the heating plant duty cycle. In squeezing out the last few points of efficiency however, new concerns have arisen, particularly those of providing adequate ventilation of the fumes of combustion and insuring that those fumes are not intermixed with the fresh heated media being circulated within the inhabited structure.

A basic problem arisig from removing heat from gases is that it reduces the tendency to naturally asperate to the atmosphere outside of the heated structure by "chimney effect". This tendency exacerbates the fume leakage problem within the structure as does the recycling of flue gases within the heating plant during periods of operation when the heating media is being circulated within the structure.

A relatively recent prior art approach to these problems was to provide a heat exchanger within the cold air return and a power vent such as a small fan, which draws some or all of the flue gases through the heat exchanger to heat the air therein and then discharge the cooled flue gases externally of the heated structure. This arrangement provides efficient removal of much of the heat from the flue gases. A somewhat serendipitous advantage of this arrangement is that it allows horizontal venting of at least some of the flue gases through the side of the structure, eliminating the need for a vertically rising stack extending through the structure's roof level.

Although a clear improvement over many prior art approaches, the arrangement described immediately herein above does have some disadvantages. The flue gases being vented are still relatively hot as they exit the structure, representing a safety hazard as well as lost heat which could potentially be turned to useful heat. Also, the additional complexity of such systems increase cost and potential failure modes.

It will be apparent from a reading of the specification that the present invention may be advantageously utilized with many different heating plants which circulate a media heated by combustion of a fuel-air mixture which requires the venting of flue gases therefrom, such as steam powered generating plants, refineries, foundaries, factories and many other commercial and residential applications. However, the invention is especially useful when applied to domestic forced air or hydronic furnaces and will be described in connection therewith.

BRIEF DESCRIPTION OF THE INVENTION

The present invention overcomes the above-described shortcomings of the prior art by providing a flue gas heat recovery apparatus including a compressor which draws relatively low temperature exhaust gases from within the exhaust flue of a heating plant at a relatively low inlet pressure and discharges the gases at an elevated outlet pressure to a heat exchanger disposed within the heating plant cold fluid return duct which receives the discharged gases to effect the transfer of thermal energy therefrom to fluid flowing within the return duct. This arrangement has the advantage of reclaiming thermal energy from flue gases whose temperature is too low to passively transfer the energy to the returning fluid through a heat exchanger above. By compressing some or all of the flue gases prior to passing them through the heat exchanger, the temperature of the gases, and thus temperature differential between the gases and the fluid flowing in the cold air return is significantly increased to enhance heat transfer therebetween. The overall operating efficiency of the heat plant is thereby substantially increased and the flue gases ultimately vented are at or near typically experienced ambient temperatures.

In the preferred embodiment of the invention, a first heat exchanger is provided within the return duct in fluid communication with the exhaust flue and a compressor is connected to draw flue gas therethrough prior to compressing them and directing them to a second heat exchanger, also within the cold air return but upstream from the first heat exchanger. This arrangement has the advantage of providing a first heat exchanger which will effect the substantial transfer of thermal energy from the gases to fluid flowing in the return duct and a second heat exchanger which will effect a further transfer of thermal energy from the gases to the fluid within the return duct due to the action of the compressor.

According to another aspect of the invention, the compressor includes a pump disposed within the cold air or fluid return intermediate the first and second heat exchangers. This arrangement has the advantage of providing still additional heat recovery from the flue gases to the fluid flowing in the cold air return.

According to another aspect of the invention, a flue gas particulate separator is provided intermediate the second heat exchanger and a low pressure sink to cleanse the vented flue gases.

According to another aspect of the invention, a damper is provided to selectively divert a portion of the exhaust flue gases to the first heat exchanger. This arrangement provides for selective control of the heat recovery apparatus to comply with changing operating and climatic conditions.

According to still another aspect of the invention, means are provided to selectively vary operation of the compressor as a function predetermined operating parameters such as ambient air temperature, time of day or year, or the like. This arrangement has the advantage of providing tailored controlled operation of a heating plant.

These and other features and advantages of this invention will become apparent upon a reading of the specification which, along with the patent drawings, describes and discloses a preferred illustrative embodiment and an alternative embodiment of the invention in detail.

The detailed description of the specific embodiment and the alternative embodiment makes reference to the accompanying drawings.

DETAILED DESCRIPTION OF THE SPECIFIC AND ALTERNATIVE EMBODIMENTS

Figure 1:
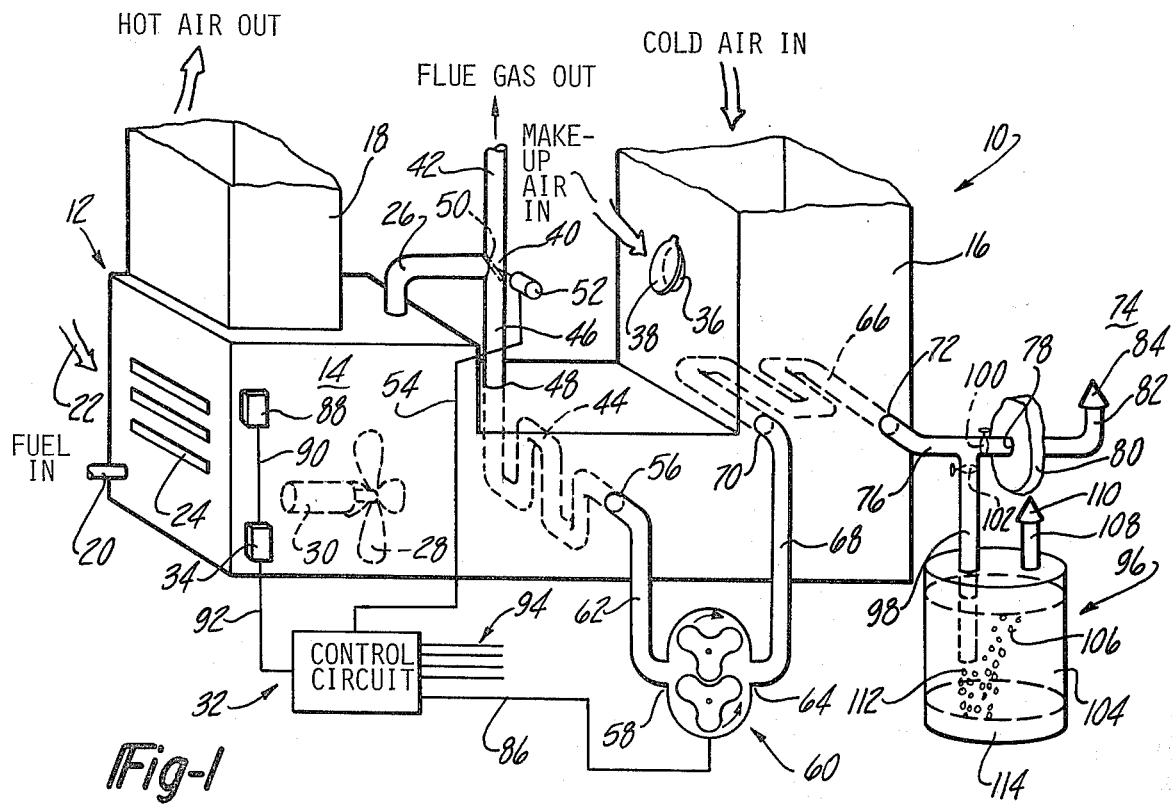
FIG. 1 is a hybrid perspective, schematic view of the preferred embodiment of the heat recovery apparatus in its environment of a typical domestic forced air furnace.

Referring to FIG. 1, the preferred embodiment of the heat recovery system, shown generally as 10, is illustrated in application within its preferred environment of a typical domestic forced air type furnace 12. The furnace 12 includes a housing 14, a cold air return duct 16 communicating generally with the lower portion of the housing 14, and a hot air duct 18 communicating with the uppermost portion of the housing 14. The furnace 12 is of substantially standard construction and, in application, is located within a structure to be heated (not illustrated). The hot air duct 18 is connected to a plenum (not illustrated) within the housing 14 and extends to a network of ducts within the structure for the distribution of hot air uniformly therethrough. The cold air return duct 16 communicates with a fan chamber within the housing 14 and extends to a cold air recovery duct network within the heated structure. A burner manifold within the housing 14 receives fuel, such as natural gas, through an inlet conduit 20 for supporting combustion thereabout when mixed with combustion air 22 which enters the housing 14 through inlet slots 24. The products of combustion are collected within the housing 14 and expelled therefrom through an outlet vent pipe 26. A fan 28 and fan driving motor 30 are located within the fan chamber of the housing 14. When energized by a control circuit shown generally at 32, the fan 28 tends to draw cool air from within the heated structure in through the cold air return duct 16 and through the housing 14 of the furnace 12. When the furnace is operating, the air is then heated and forced upwardly through the hot air duct 18 by the fan 28 for redistribution within the heated structure. The fan driving motor 30 is electrically connected to the control circuit 32 through a junction box 34 mounted on an exterior surface of the housing 14.

Makeup air, if necessary, is added to the air passing through the cold air return duct 16 through a port 36 which is selectively partially closed by a cover 38 mounted for rotation on the cold air return duct 16. The overall operation of furnace 12 will not be elaborated upon herein for the sake of brevity, it being understood that the furnace 12 is for illustrative purposes only and the operation of which is well known to those of ordinary skill in the art. Although air is being described as being heated and circulated through the associated structure, it is understood that any fluid (liquid or gaseous) media could be employed with the present invention with equal success as will be apparent herein below.

The outlet vent pipe 26 extends outwardly from the furnace 12 and terminates in a T-junction valve 40. The valve 40 includes a housing fluidly interconnected with a gas flue 42 which extends upwardly therefrom. The flue 42 extends upwardly through the roof of the associated structure and is provided with apparatus to insure the free expelling of flue gases therefrom while preventing entry of foreign material. The body of the valve 40 is also interconnected with a first heat exchanger 44 disposed within the cold air return duct 16 through an intermediate interconnecting duct 46 which extends downwardly from the valve 40 and interfaces with the heat exchanger 44 at an inlet port 48 within the cold air return duct 16. The valve 40 contains a valving member 50 therein which is pivotally repositionable between a first position (illustrated in solid line) in which the outlet vent pipe 26 is in fluid communication with the interconnecting duct 46 and the gas flue 42 is closed, and a second position (illustrated in phantom) in which the outlet vent pipe 26 is in fluid communication with the gas flue 42 and the interconnecting duct 46 is closed off. The positioning of the valving member 50 is controlled by a rotary actuator 52 of any generally commercially available type. The actuator 52 is electrically connected to the control circuit 32 by a line 54.

The first heat exchanger 44 is disposed within the cold air return duct 16 so as to traverse the entire cross sectional width thereof whereby it presents a substantial heat transferring surface area to the air flowing thereby. The first heat exchanger 44 is illustrated in schematic form only for the sake of brevity, it being understood that many designs, including piping and baffles are well known in the art and the detail thereof is not within in the scope of the present invention. The first heat exchanger 44 however, should be designed however and positioned within the cold air return duct 16 so as to not unduly restrict the flow of cold air thereby.

The first heat exchanger 44 exits cold air return duct 16 at an outlet port 56. An inlet port 58 of a variable speed compressor shown generally at 60 is fluidly interconnected with the outlet port 56 through a duct 62. The compressor 60 has an outlet port 64 which is fluidly interconnected with a second heat exchanger 66 disposed within cold air return duct 16 through an interconnecting duct 68. The duct 68 interfaces with the second heat exchanger 66 through an inlet port 70. The compressor 60 is illustrated schematically as a roots blower type pump. However, it is contemplated that any type of centrifugal or positive displacement compressor could be employed. For example, in the positive displacement category, gear, vane, or piston type pumps could be substituted. Additionally, in the centrifugal category, turbine or turbocharger type compressors could be applied. The actual type of compressor 60 employed will depend upon the application contemplated and thus the present example is not to be limiting in any sense.

The second heat exchanger 66 is disposed upstream of the first heat exchanger 44 for reasons that will become apparent herein below and, like the first heat exchanger 44 is positioned to laterally traverse substantially the entire extent of the cold air return duct 16 to provide a maximized surface area and heat exchange capability. Again, the design particulars of the second heat exchanger 66 are deleted for the sake of brevity. The second heat exchanger 66 exits cold air return duct 16 through an outlet port 72 and is vented horizontally to a low pressure sink 74 such as the atmosphere external the heated structure through an exhaust tube 76 which passes outwardly through an aperture 78 and an outside wall 80 of the heated structure. The outermost end 82 of the exhaust tube 76 is turned upwardly and provided with a vent cover 84 to prevent entry of foreign matter.

The prime mover or driving mechanism such as an electric motor (not illustrated) of the variable speed compressor 60 is electrically interconnected to the control circuit 32 by a line 86. A manual override switch 88 is electrically interconnected to the junction box 34 through a line 90 which, in turn, is electrically interconnected to the control circuit 32 through another line 92. Additional inputs indicated generally at 94 are provided to the control circuit 32 to input/outlet various control parameters such as system temperatures, pressures, outside or ambient temperature, gas valve flow control, time of the day or year, and the like. The structural details of control circuit 32 are deleted here for the sake of brevity inasmuch as any number of acceptable circuits would be obvious to anyone skilled in the art in view of the present specification and the fact that said specifics are not directly relevant to the present invention.

An exhaust flue gas cleansing bath shown generally at 96 is in selective fluid communication with the exhaust tube 76 through an interconnecting duct 98. Communication is controlled by appropriately positioned damping valves 100 and 102 within the exhaust tube 76 and the duct 98, respectively. The duct 98 terminates with a liquid separation media 104. When the valve 102 is closed and the valve 100 is opened, flue gases passing out of the second heat exchanger 66 will be vented directly to the atmosphere 74. However, when the valve 100 is selectively closed and the valve 102 is open, exhaust gases will be diverted through the cleansing bath 96. Gas will bubble as shown at 106 to the surface of the media 104 and be vented to the atmosphere 74 through a vent pipe 108 covered with a vent cover 110. The heavier particulate matter indicated generally at 112, being heavier than the media 104, will settle to the bottom of the cleansing bath 96 and form a layer of sludge 114 for periodic disposal. It is to be understood that the cleansing bath 96 is illustrated as an example only, it being understood that other suitable filtration systems can be substituted in its place without departing from the spirit of the present invention.

The preferred embodiment of the invention operates as follows. When the furnace 12 is operating, substantial quantities of flue gases are generated and vented through the outlet vent pipe 26 in the 700° to 800° F. range. When the desired structure temperature is obtained, the furnace burner is turned off. However, the thermal inertia of the furnace 12 and the heat recovery system 10 will cause substantial quantities of flue gases to continue to flow through the outlet pipe 26 for some time thereafter. If the furnace 12 is pilotless, employing a spark ignition or the like, once the system has cooled down there will be no flue gases passing through flue pipe 26. However if furnace 12 contains a standard pilot light, some flue gases will be passing through the outlet pipe 26 at all times. During operation of the furnace 12 and for a timed period thereafter to accommodate the thermal inertia of the system, the valving member 50 is positioned as illustrated and the compressor 60 is energized to draw the hot exhaust gases through the first heat exchanger 44. The fan 28 is on at the same time, causing relatively cold air to pass by the first heat exchanger 44 which imparts a substantial amount of thermal energy thereto, lowering the temperature of the flue gases at the exit of the first heat exchanger 44 to 200° F. These relatively low temperature flue gases are drawn into the compressor 60 to substantially raise the pressure and temperature thereof at the outlet port 64. The flue gases are then forced through the second heat exchanger 66 at an elevated pressure and temperature whereby further thermal energy is discharged into the cool air passing through the cold air return duct 16. Although the second heat exchanger 66 will raise the temperature of the cold return air in duct 16, the air, as it passes the first heat exchanger 44, is still substantially cooler than the flue gases therein and will thus have only a negligibly diminished heat absorbing capability. The flue gases, once exiting the second heat exchanger 66 will be lowered to a 40° to 100° F. temperature, or lower if desired, depending on the amount of compressor capacity available. However, it has been determined that economy dictates that a relatively small compressor be employed for improved overall efficiency inasmuch as an increased duty cycle is produced thereby, it being well understood that increased duty cycles coupled with reduced capacity generally improve efficiency by reducing the number of low efficiency start-ups of the furnace 12.

The control circuit 32 provides multispeed operation of the compressor 60 to compensate for seasonal variations and to provide flexible operation of the heat recovery system 10. In addition, additional inputs 94 will include those which will result in the shut down of the heat recovery system 10 should a compressor failure occur. In addition to being applicable to virtually any type of furnace, the heat recovery system 10 could be scaled up to accommodate much larger heat plants as should now be apparent to those skilled in the art. Finally, the control circuit 32 modulates the rotary actuator 52 so that it can be infinitely variable to blend or to divert only a portion of flue gases within the outlet pipe 26 to the heat recovery system 10 while permitting the balance thereof to escape through the gas flue 42.

Figure 2:
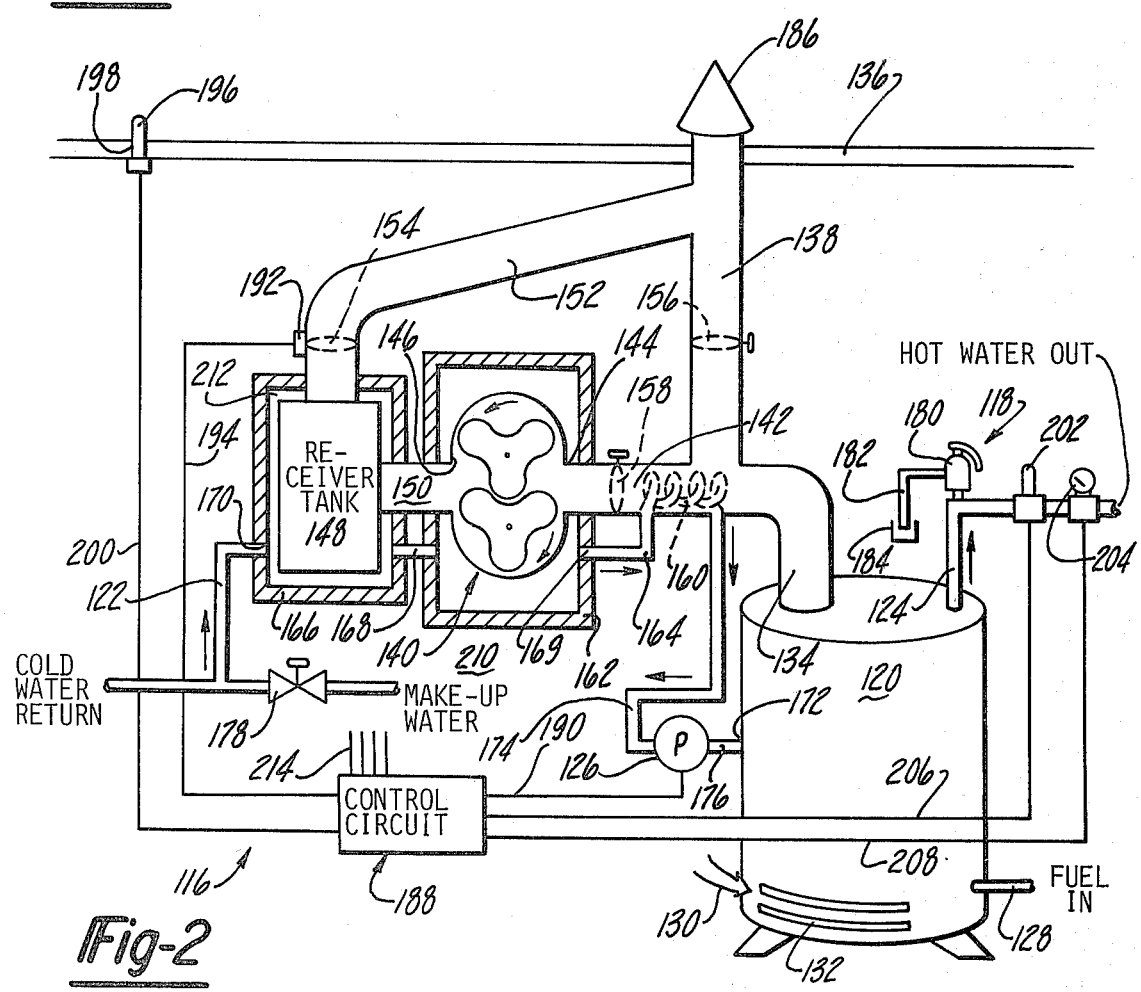
FIG. 2 is a hybrid perspective, schematic view of an alternative embodiment of the heat recovery apparatus illustrating an alternative environment of a domestic hydronic heating system.

Referring to FIG. 2, an alternative embodiment of the invention is illustrated wherein the heat recovery system shown generally at 116 is illustrated in application with a domestic hydronic heating system shown generally at 118. The heating system 118 includes a boiler 120, a cold water return pipe 122 and a hot water outlet pipe 124. The hot water outlet pipe extends to a network of radiators or steam pipes distributed throughout the heated structures which are, in turn, connected to the cold water return pipe 122. An electric pump 126 is provided to circulate water through the hydronic heating system 118 in a manner well known in the art. The boiler 120 is of conventional design including a hot water heating tank and a gas manifold (not illustrated). A fuel inlet conduit 128 supplies fuel (natural gas or the like) to the manifold and mixes it with combustion air indicated at 130 to support controlled combustion about the manifold to heat the water in the tank. Combustion air enters the boiler 120 through inlet slots 132.

Fumes and products of combustion are trapped and expelled from boiler 120 through an outlet vent pipe 134. The outlet vent pipe 134 transitions in a T-fitting in one direction to vent upwardly through a roof 136 of an associated heated structure through a flue 138. The outlet vent pipe 134 is also interconnected to a compressor, indicated generally 140, through an interconnecting conduit 142. The interconnecting conduit 142 interfaces with the compressor 140 at an inlet port 144 thereof. The compressor 140 has an outlet port 146 which is connected to a pressurized receiver tank 148 through an interconnecting conduit 150. The receiver tank 148 has an outlet conduit 152 interconnecting the receiver tank 148 with the flue 138. A release valve 154 is disposed within the outlet conduit 152 of the outlet of the receiver tank 148 to selectively interconnect the two as will be described herein below.

Vent dampers 156 and 158 are provided in flue the 138 and conduit the interconnecting 142, respectively, to allow selective diversion or blending of flue gases exiting the boiler 120 through the outlet vent pipe 134 in a manner similar as that described in the detailed description accompanying FIG. 1 hereinabove.

The cold water return pipe 122 is interfaced with a water jacket 166 enclosing receiver tank 148 through an inlet port 170. The water jacket 166 is, in turn, interconnected with a second water jacket 162 enclosing the compressor 140 through a conduit 168. A conduit 164 interconnects an outlet port 169 in the second water jacket 162 with a heat exchanger 160 disposed within outlet vent pipe 134. The heat exchanger 160 is illustrated as being a sample coil conduit but it is understood that the present invention can be practiced employing any number of heat exchangers either internal of the outlet vent pipe 134 or external thereof which would be selected as a matter of design choice. The outlet of the heat exchanger 160 is interconnected with the electric pump 126 through a conduit 174. The outlet of the electric pump 126 is interconnected with a cold water inlet port 172 of the boiler 120 through a conduit 176.

A source of makeup water is interconnected with the cold water return pipe 122 though a valve 178. A high pressure release valve 180 is connected with the hot water outlet pipe 124 and includes a spillover conduit 182 which opens into a drain shown schematically at 184. The flue 138 extends upwardly through the roof 136 and terminates in a vent cover 186 which prevents the entry of foreign matter therein.

A control circuit shown generally at 188 is provided with selected inputs and outputs to monitor various system operating parameters and to control the hydronic heating system 118 in a manner well known in the art. For this reason, many of the details of the control circuit 188 will be deleted for the sake of brevity. The control circuit 188 is connected to the electric pump 126 through a line 190 to establish a circulating flow of hot water within the heated structure. The release valve 154 is controlled by a rotary actuator 192 of a type widely commercially available which is energized by the control circuit 188 through a line 194. An ambient temperature sensor 196 projects upwardly through an aperture 198 in the roof 136 and is electrically connected to the control circuit 188 by a line 200. Finally, water temperature and pressure sensors 202 and 204 are interconnected in the hot water outlet pipe 124 and are connected to the control circuit 188 by lines 206 and 208, respectively. Additional inputs 214 are provided to the control circuit 188 to monitor and/or control various system pressures, temperatures and the like as was described in the detailed description relating to FIG. 1 herein above.

The heat recovery system 116 illustrated in FIG. 2 operates as follows. Cold return water enters the system 116 through the cold water return pipe 122 and passes serially through the inlet port 170 of the water jacket 166, cavity 212 defined by the innermost surface of the water jacket 166 and the outermost surface of the receiver tank 148, conduit 168, a cavity 210 defined between the innermost surface of the water jacket 162 and the outermost surface of the compressor 140, the conduit 164, the heat exchanger 160, the conduit 174, the electric pump 126 and the conduit 176 into the cold water inlet port 172 of the boiler 120. As hot flue gases exit the boiler 120 through the outlet vent pipe 134, they pass by, through and/or around the heat exchanger 160 to heat the water flowing therethrough. If the vent damper 158 is open and the vent damper 156 is closed, the flue gases will be drawn into the compressor 140 at a relatively low temperature and pressure and pressurized therein to significantly increase their temperature for introduction into the receiver tank 148 through the interconnecting conduit 150. The water flowing within the cavity 210 will flow over the outside surface of the compressor 140 to pick up additional thermal energy therefrom. The heated pressurized flue gases stored within the receiver tank 148 will transfer thermal energy to water within the cavity 212 by virtue of its flowing over the outer surface thereof. The receiver tank 148 therefore includes a second heat exchanger. When the gases stored within the receiver tank 148 have been cooled to a certain predetermined level, the release valve 154 is opened to release those stored gases to the flue 138 through the outlet conduit 152. The release valve 154 is then closed and the receiver tank 148 is again filled with pressurized heated flue gases. It is to be understood that alternatively, the release valve 154 could be modulated or left pressurably open on the compressor 140 and run at all times during furnace operation for a continuous flow of heated pressurized gases through the receiver tank 148. In addition, the precise construction of the heat exchanger 160 and the receiver tank 148 are not elaborated upon herein inasmuch as heat exchanger designs are well known in the art and any number of approaches thereto could be applied in practicing the present invention.

It is to be understood that the invention has been described with reference to a specific embodiment and an alternative embodiment which provide the features and advantages previously described, and that such specific embodiments are susceptible of modification as will be apparent to those skilled in the art. For example, the inventive systems described can be scaled up to recover heat normally lost through the stacks of heat generating plants and the like which vent flue gases. Such scaling up, the specific selection of heat exchangers and compressor and the like, can be altered and varied in numerous ways to accommodate a specific application without departing from the spirit of the invention. In addition, it is to be understood that the temperatures and other specifics recited herein are given by way of example only and are not to be considered limiting. Accordingly, the foregoing description is not to be construed in a limiting sense.

I claim:

1. A flue gas heat recovery apparatus for use within a heating plant including an exhaust flue and a cold fluid return duct, said apparatus comprising:
    compressor means operative to draw relatively low temperature exhaust gases within said flue at a relatively low inlet pressure and to discharge said gases at an elevated outlet pressure;
    a heat exchanger disposed within said return duct and operative to receive said discharged gases to effect a transfer of thermal energy from said gases to fluid flowing within said return duct;
    means operative to selectively vary operation of said compressor as a function of predetermined operating parameters; and
    means operative to effect exhaust of gases existing said heat exchanger to a low pressure sink.

2. A flue gas heat recovery apparatus for use within a heating plant including an exhaust flue and a cold fluid return duct, said apparatus comprising:
    a first heat exchanger disposed within said return duct and in fluid communication with said exhaust flue;
    compressor means operative to draw hot exhaust gases within said flue through said first heat exchanger at a relatively low inlet pressure to effect a transfer of thermal energy from said gases to fluid flowing within said return duct, and to discharge said gases at an elevated outlet pressure;
    a second heat exchanger disposed within said return duct upstream from said first heat exchanger, and operative to receive said discharged gases to effect a further transfer of thermal energy from said gases to the fluid flowing within said return duct; and
    means operative to effect exhaust of gases existing said second heat exchanger to a low pressure sink.

3. The flue gas heat recovery apparatus of claim 2, wherein said heating plant comprises a forced air type furnace operative to circulate ambient air throughout an associated heated structure, said air being heated by controlled combustion of a fuel-oxygen mixture within said furnace.

4. The flue gas heat recovery apparatus of claim 2 wherein said heating plant comprises a hydronic system composed of a boiler and an associated plumbing network operative to circulate a liquid throughout an associated heated structure, said liquid being heated by controlled combustion of a fuel-oxygen mixture within said boiler.

5. The flue gas heat recovery apparatus of claim 2 wherein said compressor means comprises a compressor pump disposed within said return duct.

6. The flue gas heat recovery apparatus of claim 5, wherein said compressor pump is disposed intermediate said first and second heat exchangers.

7. The flue gas heat recovery apparatus of claim 2, further comprising flue gas particulate separation means disposed intermediate said second heat exchanger and said low pressure sink.

8. The flue gas heat recovery apparatus of claim 7, wherein said particulate separation means comprises a liquid bath operative to separate relatively light exhaust gas molecules from relatively heavy particulate matter.

9. The flue gas heat recovery apparatus of claim 2, wherein said low pressure sink comprises the atmosphere external of a heated structure associated with said heating plant.

10. The flue gas heat recovery apparatus of claim 2, further comprising flue gas diverter means operable to selectively divert a portion of said exhaust flue gases to said first heat exchanger.

11. The flue gas heat recovery apparatus of claim 10, wherein said flue gas diverter means comprises a damper disposed to selectively reciprocally fluidly interconnect a burner bonnet within said heating plant with said exhaust flue and said first heat exchanger.

12. The flue gas heat recovery apparatus of claim 2, further comprising means operative to selectively vary operation of said compressor as a function of predetermined operating parameters.

13. The flue gas heat recovery apparatus of claim 12, wherein one of said predetermined operating parameters comprises ambient air temperature.

14. A method of recovering heat from flue gases generated by a heating plant having an exhaust flue and a cold fluid return duct, said method comprising the steps of:
drawing at least some of said gases from within said flue at a relatively low pressure;
compressing said drawn gases to a relatively high pressure;
varying the operation of said compressor as a function of at least one predetermined operating parameter; and
directing said drawn gases through a heat exchanger disposed within said return duct to effect a transfer of thermal energy from said drawn gases to the cold fluid flowing within said return duct.

15. The method of claim 14, wherein said step of drawing at least some of said gases includes drawing said gases through a second heat exchanger disposed within said return duct downstream from said first recited heat exchanger to effect a further transfer of thermal energy from said gases to said fluid flowing within said return duct.

16. The method of claim 14, further comprising the step of exhausting said drawn gases to a low pressure sink.

17. The flue gas heat recovery apparatus of claim 1, wherein one of said predetermined operating parameters comprises ambient air temperature.

18. The flue gas heat recovery apparatus of claim 2, further comprising flue gas particulate separation means disposed intermediate said second heat exchanger and said low pressure sink.

19. The flue gas heat recover apparatus of claim 1, further comprising means operable to selectively divert a portion of said exhaust flue gases to said first heat exchanger.

20. The method of claim 14 wherein said at least one predetermined operating parameter comprises ambient air temperature.

21. The method of claim 16 further comprising prior to said step of exhausting said drawn gases, the additional step of separating flue gas particles from said flue gas using a flue gas particulate separation means.

22. The method of claim 14 wherein said step of drawing at least some of said gases from within said flue further comprises selectively varying the amount of said gases drawn from said flue in response to at least one predetermined operating parameter.

23. A method of recovering heat from flue gases generated by a heating plant having an exhaust flue and a cold fluid return duct, said method comprising the steps of:
drawing at least some of said gases from within said flue at a relatively low pressure through a first heat exchanger disposed within said return duct to effect a transfer of thermal energy from said gases to said fluid flowing within said return duct;
compressing said drawn gases to a relatively high pressure; and
directing said drawn gases through a second heat exchanger disposed within said return duct upstream of said first heat exchanger to effect a further transfer of thermal energy from said gases to fluid flowing within said return duct.

24. The method of claim 23, further comprising the step of exhausting said drawn gases to a low pressure sink.

25. The method of claim 24 further comprising prior to said step of exhausting said drawn gases, the additional step of separating flue gas particles from said flue gas using a flue gas particulate separation means.

* * * * *